(12) United States Patent
Eickhoff

(10) Patent No.: US 8,962,211 B2
(45) Date of Patent: Feb. 24, 2015

(54) RECHARGEABLE FUEL CELL

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1117 days.

(21) Appl. No.: 12/335,352

(22) Filed: Dec. 15, 2008

(65) Prior Publication Data
US 2010/0151283 A1 Jun. 17, 2010

(51) Int. Cl.
| H01M 8/24 | (2006.01) |
| --- | --- |
| H01M 8/00 | (2006.01) |
| H01M 8/02 | (2006.01) |
| H01M 8/04 | (2006.01) |
| H01M 8/10 | (2006.01) |

(52) U.S. Cl.
CPC ............ *H01M 8/2475* (2013.01); *H01M 8/004* (2013.01); *H01M 8/0297* (2013.01); *H01M 8/04208* (2013.01); *H01M 8/04216* (2013.01); *H01M 8/241* (2013.01); H01M 2008/1095 (2013.01); H01M 2250/30 (2013.01); Y02B 90/18 (2013.01); Y02E 60/50 (2013.01)
USPC .......................................... 429/466; 429/465

(58) Field of Classification Search
USPC ........................................................ 429/497
See application file for complete search history.

(56) References Cited

U.S. PATENT DOCUMENTS

| 2,935,382 A | 5/1960 | Osborn et al. |
| --- | --- | --- |
| 3,133,837 A | 5/1964 | Eidensohn |
| 3,765,946 A | 10/1973 | Werner et al. |
| 3,931,395 A | 1/1976 | Beckert et al. |
| 3,994,697 A | 11/1976 | Burke |
| 4,048,385 A | 9/1977 | Regnaut |
| 4,138,089 A | 2/1979 | McCarthy |
| 4,155,712 A | 5/1979 | Taschek |

(Continued)

FOREIGN PATENT DOCUMENTS

| DE | 19734259 A1 | 2/1999 |
| --- | --- | --- |
| EP | 1351329 A1 | 10/2003 |

(Continued)

OTHER PUBLICATIONS

Diaz, H., et al., "Thermodynamic and Structural properties of LaNi5-yAly compounds and their related hydrides", *International Journal of Hydrogen Energy*, 4, (1979), 445-454.

(Continued)

*Primary Examiner* — Ula C Ruddock
*Assistant Examiner* — Jacob Marks
(74) *Attorney, Agent, or Firm* — Schwegman, Lundberg & Woessner, P.A.

(57) ABSTRACT

A device and method of forming a power generator includes a container, a fuel cell stack within the container, a metal hydride hydrogen producing fuel within the container, wherein the fuel cell stack is sandwiched between the container and an anode support surrounding the fuel and in close thermal contact with the fuel. The fuel cell stack has a cathode electrode for exposure to oxygen and an anode electrode for exposure to hydrogen. A cathode is electrically coupled to the cathode electrode of the fuel cell stack and supported by the container such that at least a portion of it is exposed on an outside of the container. An anode is electrically coupled to the anode electrode of the fuel cell stack and supported by the container such that at least a portion of it is exposed on the outside of the container spaced apart from the exposed cathode.

16 Claims, 13 Drawing Sheets

(56) References Cited

U.S. PATENT DOCUMENTS

| | | |
|---|---|---|
| 4,261,955 A | 4/1981 | Bailey, Jr. et al. |
| 4,476,196 A | 10/1984 | Poeppel et al. |
| 4,476,197 A | 10/1984 | Herceg |
| 4,596,748 A | 6/1986 | Katz et al. |
| 4,629,664 A | 12/1986 | Tsukui et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,372,617 A | 12/1994 | Kerrebrock et al. |
| 5,449,697 A | 9/1995 | Noaki et al. |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz et al. |
| 5,849,046 A | 12/1998 | Bailey |
| 5,851,689 A | 12/1998 | Chen |
| 5,861,221 A | 1/1999 | Ledjeff et al. |
| 5,948,558 A | 9/1999 | Amendola |
| 5,974,235 A | 10/1999 | Nunally et al. |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,265,093 B1 | 7/2001 | Surampudi et al. |
| 6,268,076 B1 | 7/2001 | Diekmann et al. |
| 6,280,869 B1 | 8/2001 | Chen |
| 6,303,244 B1 | 10/2001 | Surampudi et al. |
| 6,307,605 B1 | 10/2001 | Bailey |
| 6,326,097 B1 | 12/2001 | Hockaday |
| 6,406,808 B1 | 6/2002 | Pratt et al. |
| 6,413,665 B1 | 7/2002 | Blanchet et al. |
| 6,428,680 B1 | 8/2002 | Kreichauf |
| 6,432,566 B1 | 8/2002 | Condit et al. |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,497,973 B1 | 12/2002 | Amendola |
| 6,506,510 B1 | 1/2003 | Sioui et al. |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,527,885 B2 | 5/2009 | Toukura |
| 7,691,527 B2 | 4/2010 | Petillo et al. |
| 7,807,131 B2 | 10/2010 | Eickhoff |
| 8,557,479 B2 | 10/2013 | Eickhoff et al. |
| 2001/0012494 A1 | 8/2001 | Kreichauf |
| 2001/0028973 A1 | 10/2001 | Ong et al. |
| 2002/0068213 A1 | 6/2002 | Kaiser et al. |
| 2002/0154310 A1 | 10/2002 | DiMeo, Jr. et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2003/0235728 A1 | 12/2003 | Van Zee et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0053100 A1 | 3/2004 | Stanley et al. |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0209133 A1 | 10/2004 | Hirsch et al. |
| 2004/0215407 A1 | 10/2004 | Thielman et al. |
| 2005/0022883 A1 | 2/2005 | Adams et al. |
| 2005/0079128 A1 | 4/2005 | DeVos et al. |
| 2005/0118469 A1 | 6/2005 | Leach et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0142410 A1 | 6/2005 | Higashi et al. |
| 2005/0158595 A1 | 7/2005 | Marsh et al. |
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0249993 A1* | 11/2005 | Horiuchi et al. ............. 429/32 |
| 2005/0260461 A1 | 11/2005 | Wood et al. |
| 2005/0262924 A1 | 12/2005 | Wood et al. |
| 2005/0268555 A1 | 12/2005 | Amendola |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0045228 A1 | 3/2006 | Shiao et al. |
| 2006/0102489 A1 | 5/2006 | Kelly |
| 2006/0102491 A1 | 5/2006 | Kelly et al. |
| 2006/0127722 A1 | 6/2006 | Nakajima et al. |
| 2006/0144701 A1 | 7/2006 | Kelly |
| 2006/0174952 A1 | 8/2006 | Curello |
| 2006/0210850 A1 | 9/2006 | Abouatallah et al. |
| 2006/0261349 A1 | 11/2006 | Doering et al. |
| 2007/0026282 A1* | 2/2007 | Kumagai et al. ............. 429/30 |
| 2007/0105008 A1 | 5/2007 | Gu et al. |
| 2007/0141440 A1* | 6/2007 | Yang et al. ............. 429/38 |
| 2007/0217994 A1 | 9/2007 | Amendola et al. |
| 2007/0259227 A1 | 11/2007 | Oishi et al. |
| 2007/0269698 A1 | 11/2007 | Gu |
| 2007/0275291 A1 | 11/2007 | Gu et al. |
| 2007/0277870 A1 | 12/2007 | Wechsler |
| 2007/0287059 A1 | 12/2007 | Eickhoff et al. |
| 2008/0160383 A1* | 7/2008 | Shen et al. ............. 429/34 |
| 2008/0199740 A1* | 8/2008 | Giddey et al. ............. 429/12 |
| 2008/0220300 A1 | 9/2008 | Jones et al. |

(56) References Cited

U.S. PATENT DOCUMENTS

| | | | |
|---|---|---|---|
| 2008/0233462 A1 | 9/2008 | Curello et al. | |
| 2008/0241635 A1* | 10/2008 | Sato et al. | 429/34 |
| 2008/0274393 A1* | 11/2008 | Markoski et al. | 429/41 |
| 2008/0280183 A1* | 11/2008 | Eun et al. | 429/34 |
| 2011/0003237 A1 | 1/2011 | Eickhoff et al. | |

FOREIGN PATENT DOCUMENTS

| | | | |
|---|---|---|---|
| EP | 1372205 A2 | 12/2003 | |
| EP | 1496561 A2 | 1/2005 | |
| EP | 1372205 A3 | 7/2005 | |
| EP | 1372205 B1 | 10/2008 | |
| EP | 2055669 A2 | 5/2009 | |
| EP | 2056382 A2 | 5/2009 | |
| EP | 2055669 A3 | 1/2010 | |
| GB | 723180 A | 2/1955 | |
| GB | 2164446 A | 3/1986 | |
| JP | 57138782 A | 8/1982 | |
| JP | 60000066 A | 1/1985 | |
| JP | 4342439 A | 11/1992 | |
| JP | 9326259 A | 12/1997 | |
| WO | WO-0035032 A1 | 6/2000 | |
| WO | WO-0045457 A2 | 8/2000 | |
| WO | WO-0185606 A1 | 11/2001 | |
| WO | WO-03084866 A2 | 10/2003 | |
| WO | WO-2004025750 A2 | 3/2004 | |
| WO | WO-2004035464 A2 | 4/2004 | |
| WO | WO-2004075375 A2 | 9/2004 | |
| WO | WO-2005/004273 A2 | 1/2005 | |
| WO | WO-2005013403 A2 | 2/2005 | |
| WO | WO-2006/113469 A1 | 10/2006 | |

OTHER PUBLICATIONS

Mendelsohn, M. H., et al., "The Effect of Aluminum Additions on the Structural and Hydrogen Absorption properties of AB5 Alloys with Particular reference to the LaNi5-xAlx Ternary Alloy System", *Journal of the Less-Common Metals*, 63, (1979), 193-207.

"U.S. Appl. No. 11/592,692, Non-Final Office Action mailed Jul. 23, 2010", 9 pgs.

"U.S. Appl. No. 11/592,692, Preliminary Amendment filed Nov. 3, 2006", 3 pgs.

"U.S. Appl. No. 11/592,692, Response filed Apr. 28, 2010 to Restriction Requirement mailed Mar. 31, 2010", 7 pgs.

"U.S. Appl. No. 11/592,692, Restriction Requirement mailed Mar. 31, 2010", 6 pgs.

"U.S. Appl. No. 11/606,758 Final Office Action mailed Sep. 15, 2010", 9 pgs.

"U.S. Appl. No. 11/606,758, Final Office Action mailed Jun. 10, 2009", 10 pgs.

"U.S. Appl. No. 11/606,758, Non-Final Office Action mailed Mar. 25, 2010", 11 pgs.

"U.S. Appl. No. 11/606,758, Non-Final Office Action mailed May 12, 2008", 13 pgs.

"U.S. Appl. No. 11/606,758, Non-Final Office Action mailed Nov. 13, 2009", 11 pgs.

"U.S. Appl. No. 11/606,758, Non-Final Office Action mailed Nov. 24, 2008", 10 pgs.

"U.S. Appl. No. 11/606,758, Response filed Feb. 7, 2008 to Restriction Requirement mailed Jan. 7, 2008", 6 pgs.

"U.S. Appl. No. 11/606,758, Response filed Feb. 24, 2009 to Non Final Office Action mailed Nov. 24, 2008", 9 pgs.

"U.S. Appl. No. 11/606,758, Response filed Jun. 21, 2010 to Non Final Office Action mailed Mar. 25, 2010", 12 pgs.

"U.S. Appl. No. 11/606,758, Response filed Jan. 4, 2010 to Non Final Office Action mailed Nov. 13, 2009", 12 pgs.

"U.S. Appl. No. 11/606,758, Response filed Sep. 10, 2009 to Final Office Action mailed Jun. 10, 2009", 12 pgs.

"U.S. Appl. No. 11/606,758,, Response filed Aug. 12, 2008 to Non-Final Office Action mailed May 12, 2008", 11 pgs.

"U.S. Appl. No. 11/606,759, Restriction Requirement mailed Jan. 7, 2008", 6 pgs.

"Hobby RC Industry Leaps into the Future with Hydrogen Power", http://www.horizonfuelcell.com/files/HorizonpressreleasehcellFeb2010.pdf, Horizon Fuel Cell Technologies, (Feb. 3, 2010), 2 pgs.

"International Application Serial No. PCT/US2007/085766, International Search Report mailed Apr. 2, 2008", 4 pgs.

"International Application Serial No. PCT/US2007/085766, Written Opinion mailed Apr. 2, 2008", 6 pgs.

Melanson, D., "Horizon debuts H-Cell 2.0 hydrogen fuel cell system for R/C cars", [online]. [retrieved Feb. 18, 2010]. Retrieved from the Internet: <URL: http://www.engadget.com/ 2010/02/03/horizon-debuts-h-cell-2-0-hydrogen-fuel-cell-system-for-r-c-cars/, From Engadget Blog>, (2010), 3 pgs.

Pasaogullari, U., et al., "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California, (2004), 1-9.

"U.S. Appl. No. 12/705,423, Final Office Action mailed Nov. 8, 2013", 8 pgs.

"U.S. Appl. No. 12/705,423, Final Office Action mailed Feb. 19, 2013", 7 pgs.

"U.S. Appl. No. 12/829,082, Advisory Action mailed Mar. 4, 2013", 3 pgs.

"U.S. Appl. No. 12/829,082, Response filed Feb. 20, 2013 to Final Office Action mailed Dec. 20, 2012", 10 pgs.

"U.S. Appl. No. 12/705,383, Final Office Action mailed Mar. 29, 2013", 11 pgs.

"U.S. Appl. No. 12/705,423, Response filed Apr. 19, 2013 to Final Office Action mailed Feb. 19, 2013", 10 pgs.

"U.S. Appl. No. 12/705,423, Advisory Action mailed May 10, 2013", 3 pgs.

"U.S. Appl. No. 12/705,383, Response filed May 29, 2013 to Non Final Office Action mailed Mar. 29, 2013", 13 pgs.

"U.S. Appl. No. 12/705,383, Advisory Action mailed Jul. 5, 2013", 2 pgs.

"U.S. Appl. No. 12/705,423, Non Final Office Action mailed Jul. 8, 2013", 8 pgs.

"U.S. Appl. No. 12/705,423, RCE and Response filed May 20, 2013 to Final Office Action mailed Feb. 19, 2013", 12 pgs.

"U.S. Appl. No. 12/829,082, Notice of Allowance mailed May 20, 2013", 9 pgs.

"U.S. Appl. No. 12/705,423, Response filed Oct. 8, 2013 to Non Final Office Action mailed Jul. 8, 2013", 11 pgs.

"U.S. Appl. No. 12/705,383, Non Final Office Action mailed Oct. 3, 2012", 9 pgs.

"U.S. Appl. No. 12/705,383, Response filed Dec. 28, 2012 to Non Final Office Action mailed Oct. 3, 2012", 13 pgs.

"U.S. Appl. No. 12/705,423, Amendment and Response filed Aug. 1, 2012 to Restriction Requirement mailed Jul. 16, 2012", 5 pgs.

"U.S. Appl. No. 12/705,423, Non Final Office Action mailed Sep. 6, 2012", 6 pgs.

"U.S. Appl. No. 12/705,423, Preliminary Amendment filed Feb. 10, 2011", 6 pgs.

"U.S. Appl. No. 12/705,423, Response filed Oct. 16, 2012 to Non Final Office Action mailed Sep. 6, 2012", 8 pgs.

"U.S. Appl. No. 12/705,423, Restriction Requirement mailed Jul. 16, 2012", 5 pgs.

"U.S. Appl. No. 12/829,082, Response filed Oct. 31, 2012 to Non Final Office Action mailed Sep. 24, 2012", 11 pgs.

"U.S. Appl. No. 12/829,082, Final Office Action mailed Dec. 20, 2012", 9 pgs.

"U.S. Appl. No. 12/829,082, Non Final Office Action mailed Sep. 24, 2012", 9 pgs.

"U.S. Appl. No. 12/829,082, Preliminary Amendment filed Jul. 1, 2010", 5 pgs.

"U.S. Appl. No. 12/705,383, Response filed Aug. 30, 2012 to Restriction Requirement mailed Aug. 23, 2012", 7 pgs.

"U.S. Appl. No. 12/705,383, Restriction Requirement mailed Aug. 23, 2012", 5 pgs.

"European Application Serial No. 11153723.9, European Search Report mailed Mar. 22, 2011", 2 pgs.

(56) References Cited

OTHER PUBLICATIONS

"European Application Serial No. 11153723.9, Office Action mailed May 20, 2011", 5 pgs.

"European Application Serial No. 11153723.9, Response filed Sep. 21, 2011 to Office Action mailed May 20, 2011", 15 pgs.

"European Application Serial No. 11154088.6, European Search Report mailed May 23, 2011", 3 pgs.

"European Application Serial No. 11154088.6, Office Action mailed May 30, 2011", 5 pgs.

"European Application Serial No. 11154088.6, Office Action mailed Aug. 22, 2011", 2 pgs.

"European Application Serial No. 11154088.6, Response filed Sep. 12, 2011 to Office Action mailed May 30, 2010", 12 pgs.

"U.S. Appl. No. 12/705,423, Response filed Feb. 6, 2014 to Final Office Action mailed Nov. 8, 2013", 14 pgs.

Aiello, R, et al., "Production of Hydrogen from Chemical hydrides via hydrolysis with steam", (Dec. 1999), 1123-1130.

Amendola, Steven C., et al., "A Novel High Power Density Borohydride-Air Cell", Electrochemical Society Proceedings; Abstract; vol. 98-15, (Nov. 1, 1998), 10 pgs.

Amendola, Steven C., et al., "A Safe, Portable, Hydrogen Gas Generator Using Aqueous Borohydride Solution and Ru Catalyst", International Journal of Hydrogen Energy, vol. 25, No. 10, (Oct. 2000), 969-975.

Amendola, Steven C., et al., "An Ultrasafe Hydrogen Generator: Aqueous, Alkaline Borohydride Solutins and Ru Catalyst", Abstract; Journal of Power Sources, vol. 85, No. 2, (Feb. 2000), 4 pgs.

\* cited by examiner

RECHARGEABLE FUEL CELL

BACKGROUND

Similar to batteries, fuel cells function to produce electricity through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. The apparatus and process may produce electricity continuously as long as hydrogen and oxygen are provided. While oxygen may either be stored or provided from the air, hydrogen gas may be generated from other compounds through controlled chemical reactions rather than storing hydrogen, which may need to be compressed or cryogenically cooled. As fuel cell technology evolves, so do the means by which hydrogen gas is generated for application with fuel cells.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A rechargeable fuel cell power generator may be formed in a desired shape and may have superior electrical performance and lifetime to conventional alkaline and lithium batteries. In one embodiment, the power generator includes an ultra-thin hydrogen-air PEM fuel cell enclosing a reversible metal hydride hydrogen source. The power generator is unregulated and operates at a pressure corresponding to the pressure-temperature characteristic of the metal hydride. The fuel weight/volume dominates the overall weight/volume of the power generator and yields high energy density. Rapid adsorbtion/desorbtion kinetics of the metal hydride, coupled with the heat release of the fuel cell and endothermic nature of hydrogen release of the metal hydride yield high power capability. In various embodiments, hydrogen is desorbed from the metal hydride in an endothermic reaction and consumed by the fuel cell, generating electrical power and heat. Heat generated by the fuel cell is transferred into the metal hydride, allowing it to desorb more hydrogen. Substantially the same amount of heat is generated by the fuel cell as is required by the metal hydride, allowing the temperature of the power generator to remain substantially constant during operation.

The metal hydride fuel is in close thermal contact with a fuel cell membrane to provide for heat exchange during operation. In one embodiment, the fuel is formed as fuel pellets that are comprised of a metal hydride. The fuel pellets may be segmented into a number of parts with optional gas spaces in between to facilitate transport of hydrogen. In one embodiment the metal hydride reversibly adsorbs/desorbs hydrogen based on temperature and hydrogen pressure. Desired power generator and fuel shapes include those suitable for existing and future common form factor batteries, such as AA, AAA, C, D, etc.

Figure 1:
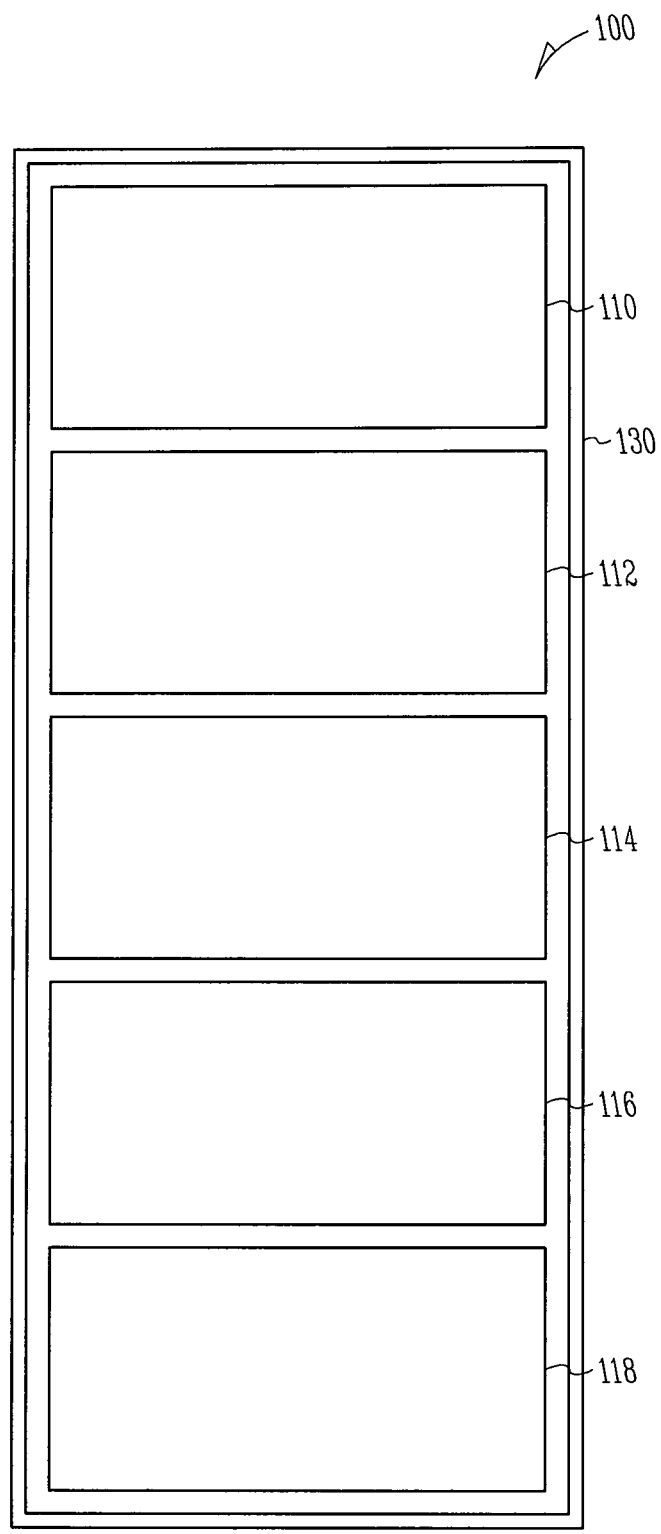
FIG. 1 is a cross section representation of a fuel pellet according to an example embodiment.

FIG. 1 illustrates a fuel pellet 100 that includes multiple segments 110, 112, 114, 116, and 118. The fuel pellet 100 may be useful in hydrogen gas generating power generators that incorporate one or more fuel cells. A power generator may include a fuel chamber within a generator housing that holds the fuel, which may be encapsulated or wrapped in a water impermeable, hydrogen permeable membrane 130. The fuel releases hydrogen gas in a reversible manner. The hydrogen is used by the at least one fuel cell to generate electricity. In one embodiment, the fuel pellet comprises a porous pellet form that allows for the diffusion of gases.

Figure 2:
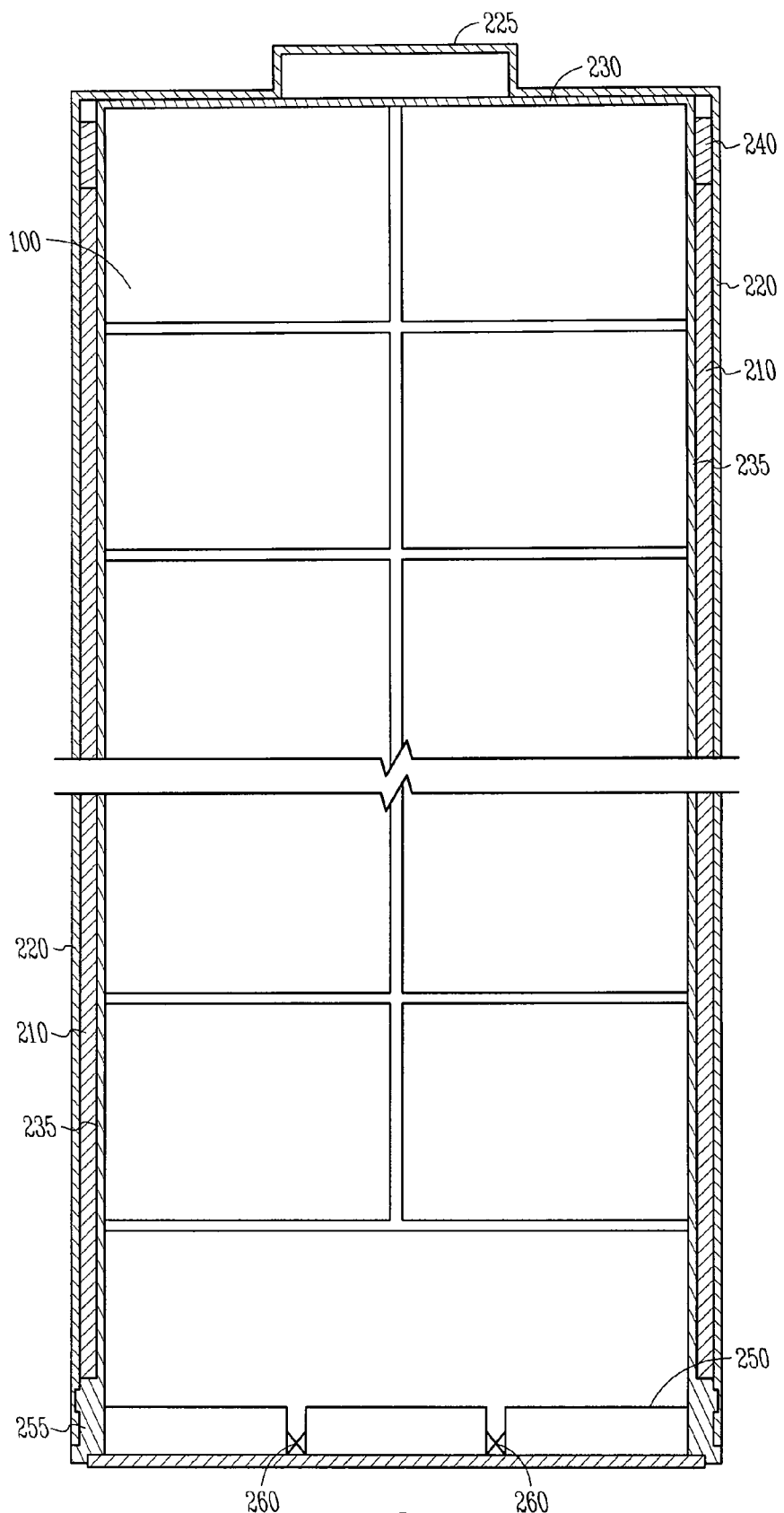
FIG. 2 is a cross section representation of a power generator incorporating a fuel pellet according to an example embodiment.

The fuel pellet 100 may be used in a power generator 200 illustrated in cross section in FIG. 2. A fuel cell stack 210 may be wrapped around the fuel pellet 100 in close thermal contact with the pellet 100. The fuel cell stack 210 may be electrically coupled to a cathode 225 and an anode electrode 230 positioned in desired locations, such as on either end of a can or container 220. Anode electrode may be formed of a conductive material such as Ni, Ni plated steel, or other material in further embodiments. Container 220 may be formed of nickel plated steel in one embodiment, or other suitable material. Container 220 may also contain perforations corresponding to perforations in the fuel cell stack to allow the flow of oxygen and water vapor to ambient. The perforations may be directly aligned with fuel cell stack perforations in one embodiment.

In one embodiment, the container 220 has a shape adapted to be consistent with desired common battery shapes, such as "AA", "AAA", "C", "D", and other types of cells. The fuel pellet may have a cylindrical shape and also may be adapted to be consistent with the desired shape. Other shapes of containers may also be provided consistent with other battery shapes existing or new battery shapes.

In one embodiment, the fuel 100 is disposed within an anode support 235, which provides support for fuel cell stack 210. The fuel cell stack 210 consumes hydrogen and oxygen and produces electricity, heat and water vapor. The fuel 100, when releasing hydrogen, absorbs heat. The fuel 100 and fuel cell stack 210 are placed adjacent to each other such that the fuel 100 absorbs the heat produced by the fuel cell stack 210, maintaining the power generator 200 at a substantially constant operating temperature.

In one embodiment, the fuel cell stack 210 is sandwiched between the anode support 235 and the container 220, which provide a mechanical compression that facilitates good electrical contact between various layers of the fuel cell stack 210. A compression ring 240, such as a nickel ring, may be used to force or compress electrode tabs between various layers of material in the fuel cell stack to connect cells in series. In one embodiment, it connects a cathode tab of the fuel cell to the container, and also may compress a cathode electrode to ensure good electrical contact with a cathode tab. The tabs are shown in further detail below describing the construction of various layers of the fuel cell stack.

A plug 250 may be mated with a thicker portion of the anode support as indicated at 255. A threaded connection may be used in one embodiment. One or more valves 260 disposed within the plug 250 may be used to allow preloading of the fuel 100 with hydrogen at an elevated pressure. In further embodiments, the plug may be coupled to the anode support once the fuel has been preloaded. No valves need be used in this embodiment. Anode electrode 230 may then be placed adjacent the plug 255, electrically coupled to the anode support 235 and secured in place to the plug such as by epoxy adhesive or other means.

In some embodiments, the anode electrode 230 may be easily removable to allow access for recharging the fuel 100, either by the use of valves 260, or removal of plug 255. In still further embodiments, a valve may be provided in or proximate to the anode electrode 230 to allow recharging of the fuel 100 without removal of the anode electrode 230.

During initial fueling or refueling, the fuel 100 may be pumped to a low pressure, near a vacuum in some embodiments. This serves to remove gases and potential water vapor from the fuel. Then, hydrogen is reloaded into the fuel at a desired pressure, and the fuel is sealed. In one embodiment, the range of operating pressures is between 0.1 and 100 PSI. If the pressure is too low, the cell potential will be low and the cell will operate at reduced efficiency and at low current. If the pressure is too high, excessive hydrogen may leak to ambient, decreasing the total electrical energy that can be generated per charge.

The power generator is self regulating based on the pressure and electrical demand. As electrical demand increases, hydrogen is consumed to produce the electricity needed by a load. As the hydrogen is consumed, pressure within the fuel 100 drops, resulting in the release of more hydrogen. As the electrical demand of the load decreases, less hydrogen is consumed, resulting in an increase in pressure, and preventing the further release of hydrogen from fuel 100. The hydrogen release rate can be very fast, limited only by the rate at which heat can be transferred to the fuel. In this manner, the power generator may provide bursts of power, without great deviation in pressure. The operating temperature may affect the equilibrium pressure within the cell, as the pressure varies with temperature.

In one embodiment, AB5 type materials such as LaNi5, or alloys containing other metals such as aluminum may be used as the reversible metal hydride. The other alloys such as aluminum may be used to tailor the pressure-temperature characteristics of the fuel so that the equilibrium hydrogen pressure at room temperature, approximately 20° C. is in the range of 0.1 PSI up to about 100 PSI or higher. In one embodiment, the pressure ranges up to about 10 PSI to avoid high rates of hydrogen leakage to ambient. Some applications may use even higher pressure with stronger containers. A higher fraction of aluminum results in a lower pressure equilibrium.

Figure 3:
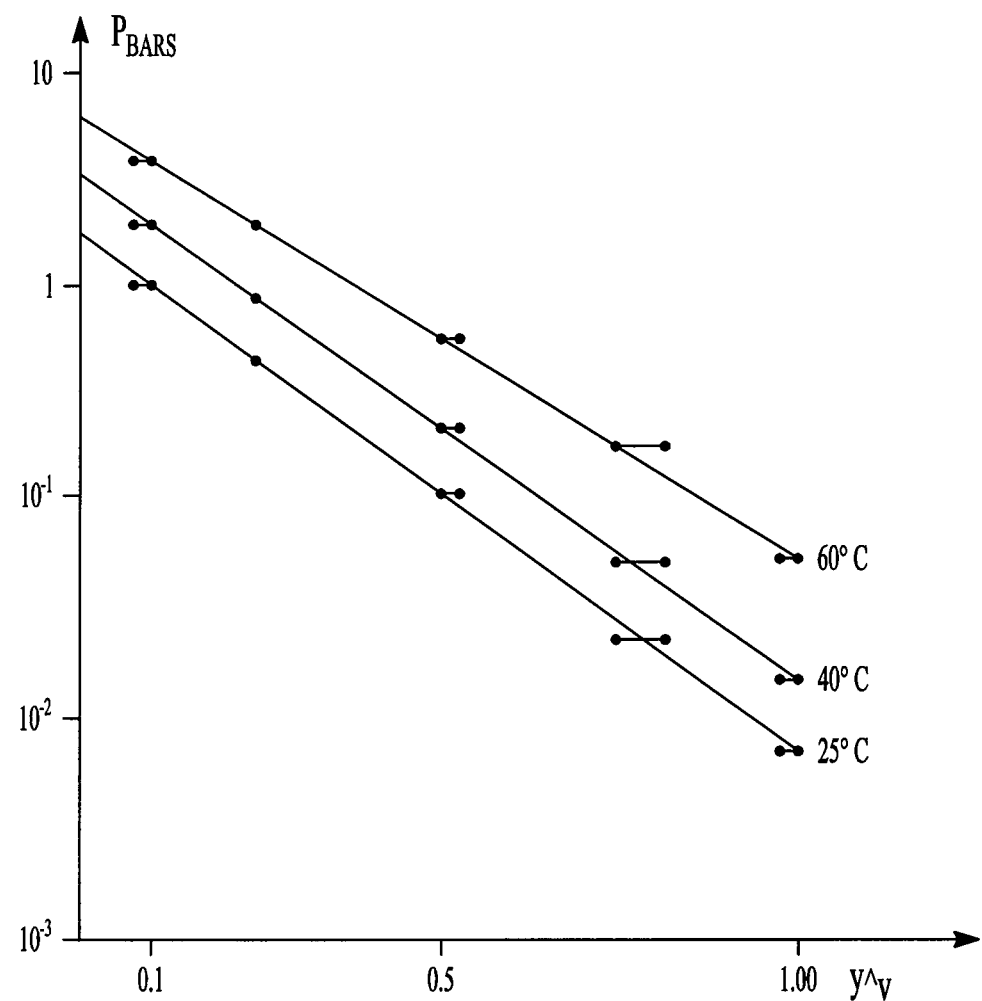
FIG. 3 is graph illustrating the effects of temperature and aluminum content on the equilibrium hydrogen pressure according to an example embodiment.

FIG. 3 is a graph illustrating the effects of temperature and aluminum content on the equilibrium hydrogen pressure. It shows the influence of the substitution rate in the intermetallic compounds on the equilibrium pressure of related hydrides. Equilibrium pressure is plotted against the aluminum rate in intermetallic compounds $y_{Al}$. The variation of the plateau pressures of the hydrides appears to change linearly with the rate of aluminum. The variation is shown for three temperatures of 25, 40 and 60° C. The fuels may be encapsulated using any suitable method which would be appropriate for the chosen encapsulation material, such as wrapping, coating and the like.

In one embodiment, the pellets are solid and approximately 20% porous. The porosity may be varied to control volume expansion and hydrogen generation rate. Multiple pellet segments may be stacked vertically to provide a cylindrical pellet with larger height. The height of the individual segments may also be varied to increase the pellet surface area, which may also increase the hydrogen generation rate.

Figures 4, 5:
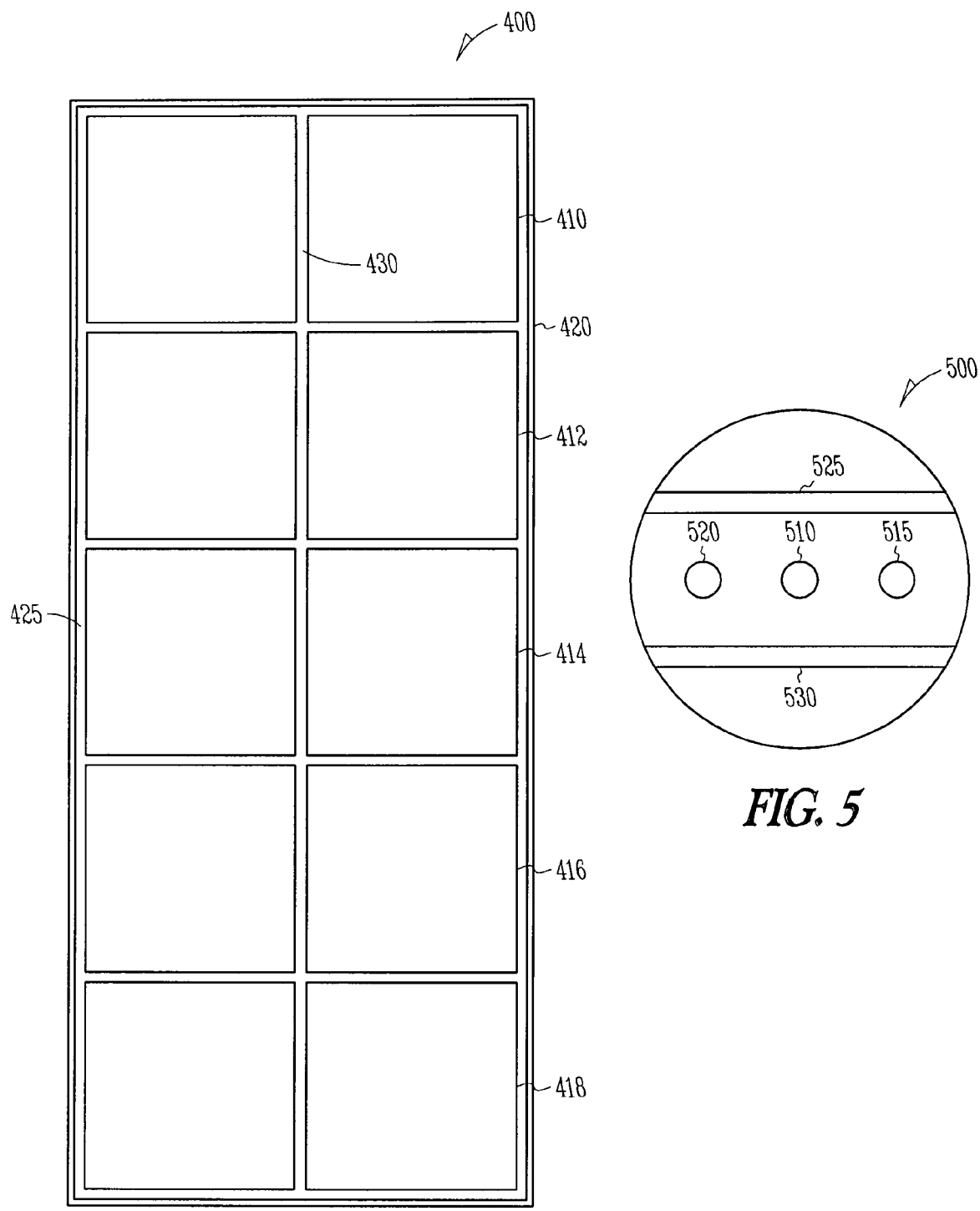
FIG. 4 is a cross section representation of a plurality of segments of a fuel pellet having a bore according to an example embodiment.
FIG. 5 is a cross section representation of a cylindrical fuel pellet having multiple bores according to an example embodiment.

FIG. 4 is a cross section representation of a further fuel package 400. Fuel package 400 includes multiple metal hydride fuel pellet segments 410, 412, 414, 416, and 418 stacked in a vertical relationship. A hydrogen permeable membrane 420 may optionally be disposed about the fuel pellet segments, which may be cylindrical in shape. The membrane 420 may extend over the ends of the stack of fuel pellets in some embodiments. An air gap may be provided between the membrane 420 and fuel pellet if desired.

A bore 430 may be formed in the fuel pellet in one embodiment. The bore 430 may extend through one or more segments, or may extend partially through one or more segments. In one embodiment, the bore is concentric with the axis of the fuel pellet, but may also be parallel, or transverse to the axis or at any angle therebetween. The bore 430 may provide room for expansion of the fuel pellet under varying time and environmental conditions, and allow hydrogen to diffuse axially during discharge or recharge.

Metal hydride may be chosen as a fuel material for the storage element 127 in one embodiment such that its equilibrium pressure is in the range of approximately 0.01 to 10 atmospheres over an approximately −20 to 60° C. temperature range. Potential metal hydrides include ab5, ab2, ab, complex alloys, intermetallic compounds or solid solution alloys. Specific materials include but are not limited to $LaNi_5$, $LaNi_4.6Mn_{0.4}$, $MnNi_{3.5}Co_{0.7}Al_{0.8}$, $MnNi_4.2Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, and $LaNi_{4.7}Al_{0.3}$.

Metal Hydride Preparation Process

The metal hydride fuel may be prepared by first crushing or grinding metal hydride (in a ball mill, for example) to obtain metal hydride particles in the range from 1 um to 1 mm (particles in the range of 10 to 100 um are desired in one embodiment). The metal hydride may also be prepared by repeated exposure to high pressure hydrogen (>500 psi) and then vacuum, which breaks the metal hydride into smaller particles. The resulting metal hydride may then be heated to >100° C. under vacuum (Pressure <10 mTorr) for several hours. High pressure hydrogen (>500 psi) may be applied for several hours. The heating and high hydrogen pressure steps may be repeated for several cycles. The metal hydride may be encapsulated using a fumed silica or sol-gel process described below, or alternately coated with copper. The resulting encapsulated or coated metal hydride may be molded in a cylindrical pellet form. This is just one example method for preparing metal hydride for a pellet. The parameters may be varied in further embodiments, and different methods may be used as desired.

Encapsulation Process (Fumed Silica Method)

One method which may be utilized to embed or encapsulate metal hydride particles in a silica network begins by providing a pre-determined amount of amorphous fumed silica. This substance may be a high purity silicon oxide ($SiO_2$) and is commercially available, such as CAB-O-Sil. RTM. grade EH-5 from CABOT Corporation. Fumed silica may be formed by burning silicon tetrachloride vapor in a flame of hydrogen and oxygen.

In one embodiment, the fumed silica is then blended into water to form a paste via a polymerization process. The weight ratio of water to fumed silica can range from 3:1 to 9:1. Metal hydride particles are added to the paste to be embedded into the silica network. The weight ratio of the metal hydride particles to the fumed silica in the paste ranges from 0.18:1 to 2.3:1. In practice, the metal hydride typically comprises 15% to 70% of the finished product by weight. In one embodiment, the metal hydride particles have sizes ranging from 0.5 µm to 100 µm. In one embodiment, it is desired that the particles are smaller than 50 µm. Examples of hydrides that can be used in the composition include pure hydrides such as Pd and more complex alloys of Pd, Ti, La, Ni, Zr, Co and Al. In further embodiments, metal hydrides may be produced in the form of fine particles.

According to one embodiment, the paste is then allowed to dry to form a solid. The simplest method for drying the paste is to allow it to air dry. However, using heat and/or vacuum drying techniques may provide additional beneficial properties. Next, the solid composition may be ground up using a commercial grinder, grain mill or simply a mortar and pestle. Typically the ground up solid is filtered through a sieve to collect granules of a desired size for packing into columns or beds commonly used in hydrogen storage or separations systems.

If desired, the ground up solid can be added back into a new paste of fumed silica and then dried and ground up to form a composition having a double layer of silica with metal hydride particles embedded in the layers. The process may be repeated to generate a composition having multiple silica layers.

Alternatively, the paste can be poured into a mold and then dried using the techniques discussed above to form plates, cylinders, or other desired forms for use in filtering hydrogen from other gases.

For applications where mechanical strength is critical, the paste can be impregnated in a porous substrate or wire network and once again dried using the techniques discussed above. Advantageously, the paste is quite versatile and is readily adaptable for use in a variety of applications.

According to another embodiment of the invention, greater resistance to oxygen and other impurities, a liquid that is non-soluble in water can be added to the paste. Examples of such liquids include common paint thinner and mineral oil spirit type 11, grade A. The non-soluble liquid has the effect of breaking down the paste into particulates that can then be dried using the techniques discussed above. The following steps describe one example embodiment of the invention incorporating the non-soluble liquid.

First, acquire 85 grams of fumed silica, 33 grams of $LaNi_4.25Al_{0.75}$ powder (metal hydride) having a particle size .ltoreq.45 µm and 351 grams of deionized water. The water may then be placed in a blender at median speed. Add the fumed silica and the metal hydride to the water gradually until the entire amount is added and a uniform paste is formed. Switch the blender to low speed and pour into the paste 170 cc of paint thinner (non-soluble liquid). Continue blending until the paste is broken into particulates. The particulates can then be removed from the blender and dried using the techniques discussed above. In addition, the particulates can be ground up and run through a sieve to collect a preferred granule size for the final product.

If desired, the final product based on the embodiments discussed above can be heat treated in the presence of an inert noble gas such as He or Ar to adjust the porosity or mechanical strength of the composition. This heat treating process is known as sintering.

In the final product, the silica particles form a porous network via polymerization of the silica molecules at contacting points. The size of the pores in the network is typically between 1 and 100 nanometers. In contrast, the metal hydride particles are only 0.5 µm (fines) to 100 µm large. Since the metal hydride particles are 5 to 1000 times larger than the silica pores, the metal hydride particles are easily retained in the network. When the product is exposed to a gas mixture containing hydrogen and other gases or undesirable impurities, the hydrogen is able to pass freely through the pores of the network because of its small molecular size. Conversely, the larger molecules of the other gases or impurities are filtered by the silica network from reaching the metal hydride particles held therein. Thus, the product can be freely exposed to the atmosphere without fear of oxidizing the embedded metal hydride. In some embodiments, CO molecules may be filtered with some degree of success. In addition to acting as a filter, the silica network may also provide dimensional stability to the metal hydrides to curb their tendency to break into fines after repeated exposure to hydrogen. Although the silica network cannot prevent the formation of fines entirely, any fines that are produced are held within the network and prevented from finding their way into the hydrogen storage equipment causing resistance to gas flow or even plugging up the system.

Encapsulation Process (Sol-Gel Process)

In one embodiment of the present invention, a hydride composition may be prepared by a sol-gel process generally as follows. The starting material is an organometallic compound such as tetraethoxysilane. A sol may be prepared by mixing the starting material, alcohol, water, and an acid. The sol is conditioned to the proper viscosity and a hydride in the form of a fine powder is added. The mixture is polymerized, then dried under supercritical conditions. The final product is a composition combining an inert, stable and highly porous matrix with a uniformly-dispersed hydride. The composition can rapidly and reversibly absorb surprisingly large amounts of hydrogen (up to approximately 30 moles/kg) at room temperature and pressure. Hydrogen absorbed by the composition can be readily be recovered by application of heat or vacuum.

The composition may be prepared as follows:

1. To prepare the sol solution, add alcohol to water while stirring the water to form a first mixture. The ratio of alcohol to water in the mixture is preferably in the range of two to five parts of alcohol to one part of water. The ratio is chosen in view of the desired properties of the final product. For example, the higher the alcohol:water ratio of the mixture, the more uniform the final product; and the lower this ratio, the more granular the product. Preferably, the alcohol is ethanol, although other alcohols such as methanol may be used.

2. Adjust the acidity of the mixture by adding hydrochloric acid (HCl) until the pH is in the approximate range of 1.0 to 2.5. Stir the mixture for several minutes, preferably for approximately thirty minutes. If desired, other acids such as hydrosulfiric acid ($H_2SO_4$) or nitric acid,($HNO_3$) may be used. The pH and temperature of the mixture affect the properties of the final product, including its density, porosity, and specific surface area. The optimum conditions for producing a composition with the desired properties are therefore best determined by observation and a modest degree of experimentation.

3. Separately prepare a second mixture by mixing alcohol and an organometallic compound such as tetraethoxysilane (($C_2H_5O)_4Si$). Add alcohol to the tetraethoxysilane in the ratio of approximately one part ethanol to two parts tetraethoxysilane. Stir for several minutes, preferably for approximately thirty minutes. As for step (1) above, while ethanol is preferred, other alcohols such as methanol may be used.

Suitable organometallic compounds for use in the present invention include, but are not limited to, organometals of the forms $MO_xR_y$ and $M(OR)_x$, where R is an alkyl group of the form $C_nH_{2n+1}$, M is an oxide-forming metal, n, x, and y are integers, and y is two less than the valence of M. Other suitable organometals include the alkoxysilanes, particularly tetraethoxysilane. It will be understood that the optimum admixture of alcohol depends on the particular choice of organometal and the desired properties of the final product.

4. Add the first mixture to the second very slowly, preferably dropwise, stirring continuously, to form the sol solution.

5. Allow the sol to condition in a closed container for several hours at room temperature, preferably for about 24 hours.

6. Remove the cover of the container to evaporate some of the solvents, until the sol reaches the approximate viscosity of heavy oil.

7. When the sol reaches the proper viscosity, add a hydride in the form of fine particles, and stir to uniformly suspend the hydride particles in the solution. The hydride may be added in an amount up to approximately 50 wt. % of the dry gel. However, the catalytic effect of the hydride (discussed below) may be evident even with very small admixtures, as small as 1 wt. % or less of the dry gel.

The hydrogen-absorption rate of hydrides is typically proportional to their surface area. Therefore, the smaller the particle size, the larger the surface area of the hydride and the better its overall hydrogen-absorption rate. The hydride may be a transition metal hydride such as Al, Cu, La, Ni, Pd, Pt, or combinations thereof, and most preferably Pt or a La—Ni—Al alloy. The hydride may be supplied in the form of a fine powder having particles less than approximately 100 μm in size.

8. If desired, the density of the sol-hydride mixture can be adjusted by adding a foaming agent. Suitable foaming agents include, but are not limited to, alkali metal soaps, metal soaps, quaternary ammonium compounds, detergents, alkali metal phosphates, and amino compounds.

9. Polymerize the mixture by equilibrating in air at room temperature and pressure until a gel containing the polymerized material and a liquid as two continuous phases is formed.

Depending on the properties of the sol and the desired properties of the final product, polymerization may be carried out at different temperatures or pressures, in an inert atmosphere (such as helium or argon), or some convenient combination thereof. For example, lower temperatures typically slow down the polymerization reaction and may be desirable to prevent overly abrupt polymerization. The time required for substantially complete polymerization varies from a few minutes to several days, depending on the temperature, pressure, atmosphere, the pH of the sol, the materials used to produce the sol, and so forth.

The optimum conditions for polymerization are best determined by experimentation for each particular combination of materials in view of the desired properties of the composition. Process steps 1 to 8 as described above may also be carried out at any convenient temperature and pressure, or in atmospheres other than air, including but not limited to helium and argon.

10. Dry the gel to remove the liquid phase. Drying may be carried out at the supercritical conditions of ethanol (or other alcohol produced in the polymerization process), that is, the temperature and pressure are maintained at the point where the solid, liquid, and vapor phases of ethanol coexist (243° C. and 63 atm.). Drying under supercritical conditions can yield a composition with a porosity of 90% or higher. Alternatively, drying may be carried out in air, or in other atmospheres including inert atmospheres when a greater density is acceptable.

It will be understood that the process steps described above may be varied in different embodiments. By way of example only, the sol solution (steps 1 to 6) may be prepared by another suitable procedure known in the art, or conditioning (step 5) or evaporation (step 6) omitted if the mixture has a suitable viscosity.

The final product is a composition comprising a porous glass matrix containing uniformly distributed hydride particles. The matrix is highly porous, preferably with a porosity greater than 80% porous and most preferably greater than about 90%. Because of its high porosity, the matrix has a very large specific surface area, preferably greater than approximately 300 $m^2$/gram and most preferably 1000 $m^2$/gram or higher. The composition can be fabricated in the form of pellets or other shapes dimensioned to the anticipated use. The pellets are dimensionally stable, remaining intact after many hydrogen absorption-desorption cycles.

The higher the porosity and specific surface area of the composition, the more matrix surface and hydride surface is available for hydrogen absorption. As noted above, the surface of a porous glass composition normally absorbs only a small amount of hydrogen. Here, surprisingly, the combination of the aerogel matrix and the hdyride is capable of storing very large amounts of hydrogen, more than the sum of the individual capacities of the aerogel and the hydride. While not wishing to be bound by theory, it is believed that the hydride may act as a catalyst to improve the hydrogen-storage capability of the composition. This catalytic effect should be evident even at very low hydride concentrations, as low as 1 wt. % of the dry gel.

By way of example, a composition in a further embodiment may be prepared by adding two parts ethanol to one part water, and adjusting the pH by adding hydrochloric acid. The pH-adjusted mixture is added to a mixture of approximately one part ethanol to two parts tetraethoxysilane. The sol is stirred for thirty minutes, then conditioned for about 24 hours and evaporated until it reaches the approximate viscosity of heavy oil. A hydride in an amount of 40 wt. % of the dry gel is added. The hydride is La—Ni—Al alloy, preferably in the form of particles less than 100 μm in size in order to promote uniform dispersion throughout the matrix and more effective contact with hydrogen, in an amount of 40 wt. % of the dry gel. The mixture is polymerized, then dried at room temperature and pressure.

This composition absorbs up to 10 moles/kg of hydrogen at room temperature and atmospheric pressure. The amount of hydride present in one kilogram of the composition is capable of absorbing only 5 moles of hydrogen. Since the aerogel alone can absorb only a negligible amount of hydrogen, the increased capacity is due to the synergy of the hydride and aerogel.

Depending on the choice of ingredients and the conditions under which the process steps are carried out, the composition may absorb up to 30 moles of hydrogen per kilogram at room temperature and pressure, rapidly and reversibly. Hydrogen absorbed by the composition can readily be recovered by heat or evacuation. Uses for the composition include hydrogen storage and recovery, recovery of hydrogen from gas mixtures, and pumping and compressing hydrogen gas.

Properties and Characteristics of Metal Hydrides

Aluminum substitution in $LaNi_5$ may affect the equilibrium hydrogen pressure, decreasing it with increased substitution. In one embodiment, it is desired to use an aluminum substitution (y value) of between 0.1 and 1, which yields an equilibrium pressure at 25 C of ~1.0-0.1 bar.

In one embodiment, the metal hydride comprises (LaNiAl, TiFe, etc). Metal hydrides have the ability to quickly and reversibly adsorb and desorb large quantities of hydrogen at a relatively constant pressure. Thus, when a current (power) pulse is required, the metal hydride can quickly desorb enough hydrogen to maintain the pulse for long periods of time.

In one embodiment, a surrounding layer of water reactive hydrogen liberating material such as $LiAlH_4$ insures that no water vapor reaches the metal hydride, to prevent corrosion/degradation of metal hydride.

By positioning the metal hydride in close thermal contact with the exothermic reacting fuel cell, in the metal hydride absorbs heat, allowing it to desorb (discharge) hydrogen. As electrical demands decrease, less heat is generated by the fuel cell, and the metal hydride may absorb hydrogen not used to generate electricity.

In one embodiment, a plurality of bores may be provided as illustrated in a top view of a fuel pellet 500 as illustrated in FIG. 5. A vertical bore 510 along the axis is formed in one embodiment, with other vertical bores 515 and 420 illustrated. Horizontal bores 525 and 530 are also illustrated. Bores may also be formed on angles between those shown in further embodiments. Single or multiple bores at the same or different angles may be utilized in various embodiments. The bores may be left open, providing paths for hydrogen absorption and desorption.

Copper Coating Process:

In one embodiment, the metal hydride may be coated with copper to prevent breakdown during hydrogen adsorbtion/desorbtion and corrosion upon exposure to water vapor or oxygen. With respect to the process described below, the quantities used in the process are scalable, the alcohol is ethanol, $CH_3CH_2OH$, or other alcohol based on input. In one embodiment, LaNiAl is used along with a Cu ratio of 100:5. The ratio may be varied according to the need. Selected steps may be performed quickly to minimize evaporation.

Procedure:
In a first container:
1. Dissolve 3.5 g $CuSO_4$ into 50 ml water.
2. Add 0.5 g EDTA (ethylenediamine tetraacetic acid, $(HO_2CCH_2)_2NCH_2CH_2N(CH_2CO_2H)_2$).
3. Heat at 50° C., agitate for 30 min to form the coating solution.

In a second container:
1. Wet 27.9 g $LaNi_{4.25}Al_{0.75}$ powders with 0.63 g (~0.79 cc) ethanol ($CH_3CH_2OH$).
2. Add drops of formaldehyde (HCHO), total 1.3 g (~1.59 cc). Agitate to make it uniform.

In a combined container:
1. Combine the wetted $LaNi_{4.25}Al_{0.75}$ and the coating solution. Agitate intensively for 10 min.
2. Filter out the $LaNi_{4.25}Al_{0.75}$ powders.
3. Rinse 5 times with DI water. Dry naturally in air.
4. (optional) Finally, compress the powders into desired shape. Use a top compressive pressure of 20 MPa.

Manufacturing a Fuel Cell Stack

In one embodiment, a fuel cell stack, such as fuel cell stack 210 may be manufactured as a thin film. It may be less than one mm thick in some embodiments, and flexible such that it is conformable to many different shapes. Multiple layers of the fuel cell stack 210 may be rolled or otherwise stacked together, and result in a flexible film that can be bent around the fuel for ease of manufacture. The following layers are described for use in a cylindrical battery shape. Other layouts of layers may be used to form different shapes. The example layouts provide for the formation to two fuel cells coupled in series.

Figure 6:
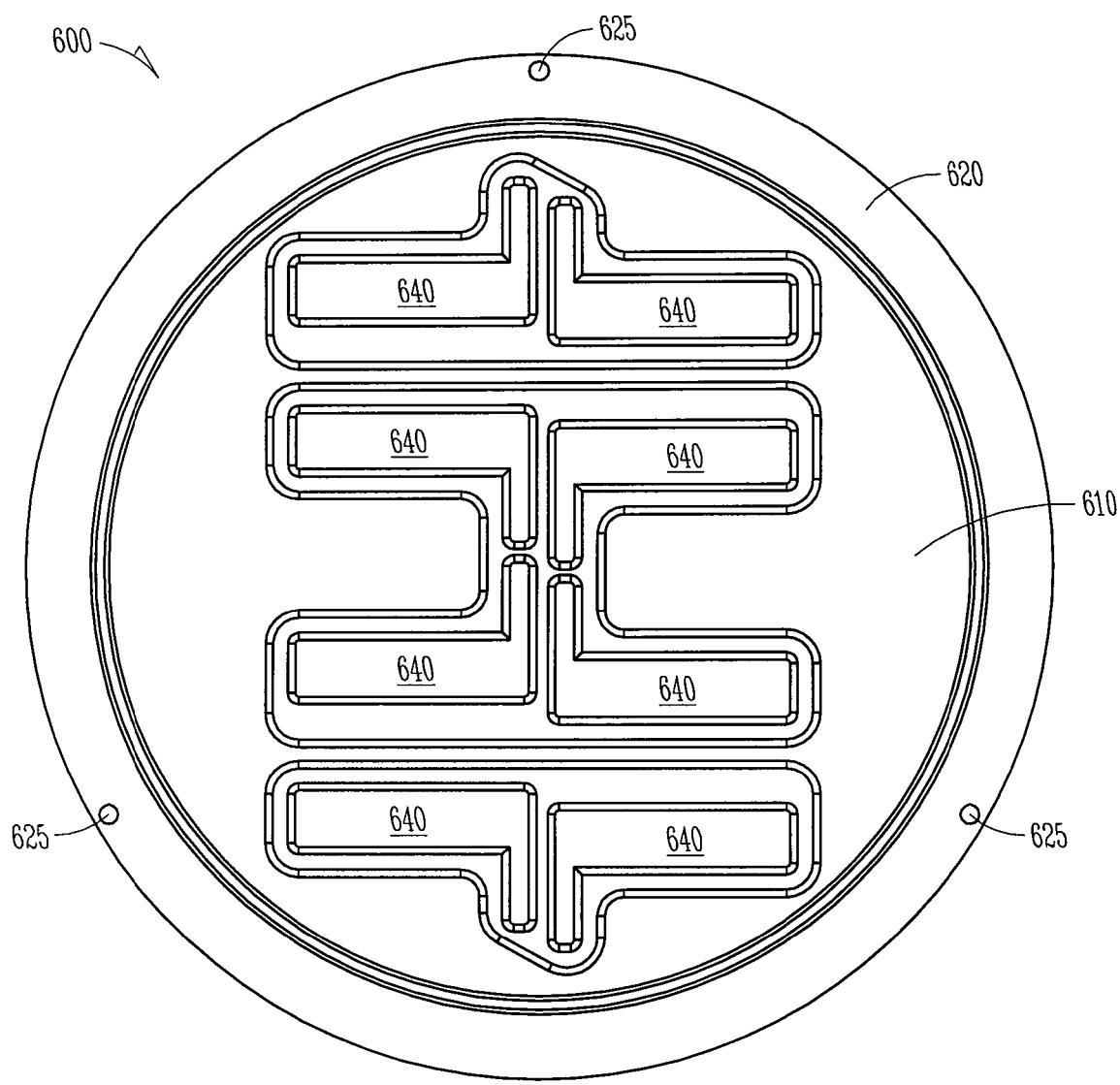
FIG. 6 is a top view of an anode mask according to an example embodiment.

The formation of the individual layers in the fuel cell stack will now be described, followed by an expanded view illustrating how the layers are assembled and used in a power generator. To form the anode electrode, an anode mask 600 in FIG. 6 may be used in one embodiment. A polymer substrate 610, such as KAPTON, or PET is taughtly supported by a ring 620. The ring 620 contains registration or alignment devices such as pins 625 to allow precise positioning of the ring 620. The mask 600 has multiple openings 640 to allow deposition of metal through the mask openings 640 forming four pairs of anodes in this example.

Figure 7:
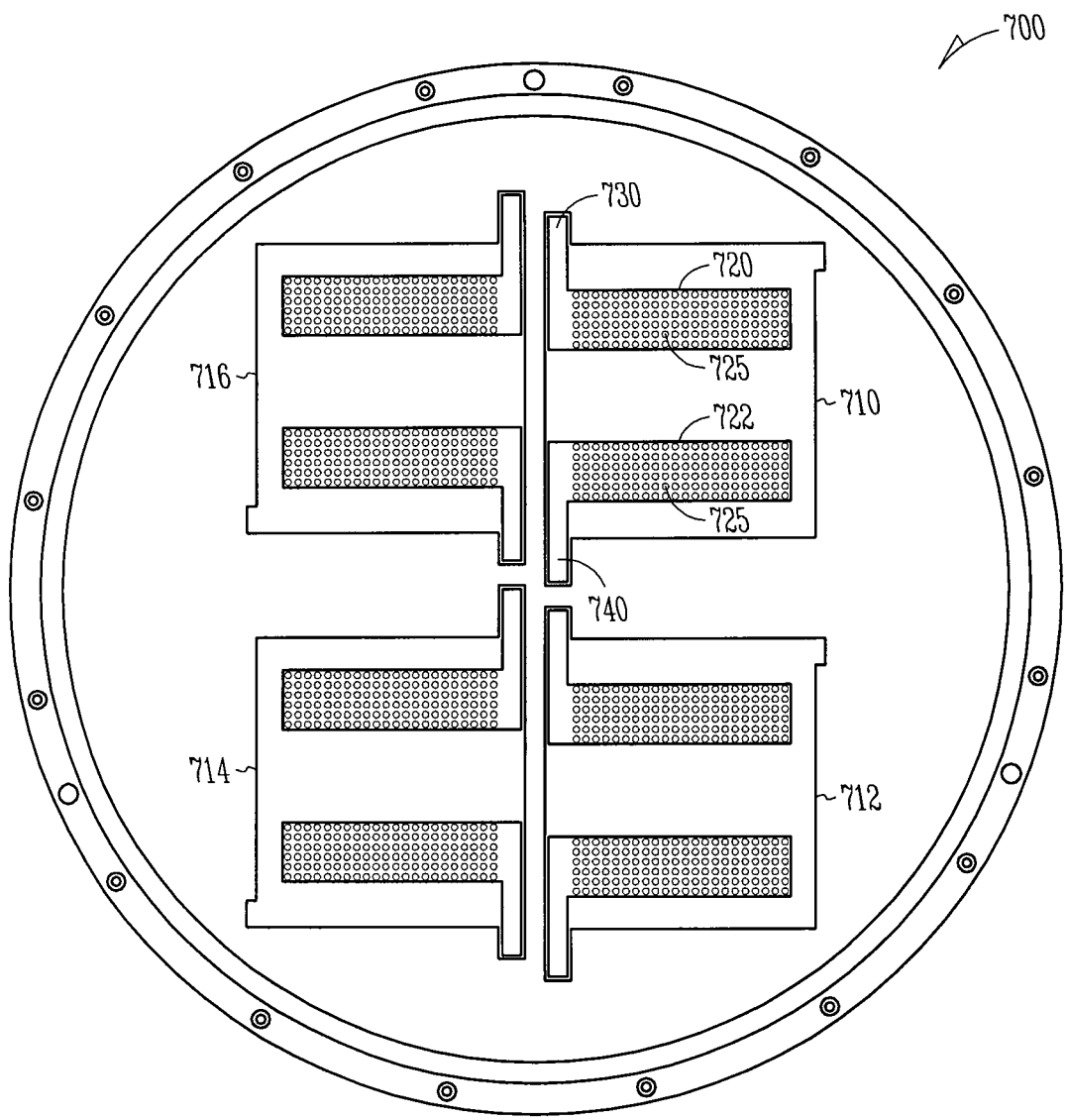
FIG. 7 is an illustration of multiple patterned anodes having holes according to an example embodiment.

Metal may be deposited such as by evaporation through the mask 600 onto a 2 mil thick PET layer in one embodiment. A typical metallization process may include an ion mill to clean the PET surface, followed by a deposition of a few hundred angstrom (200-300 in one embodiment) of a Ti and/or Al adhesion layer, followed by 1-2 microns of Au (gold). Other conductive materials may be used, but it is desirable that they be highly conductive and corrosion resistant. Many other processes may be used for forming the conductive layer or layers of the anode. After deposition, the mask 600 is lifted, and a laser may be used to cut individual patterns 710, 712, 714 and 716 as shown in FIG. 7. Each pattern contains two anodes 720, 722 that have laser cut holes 725 to allow for gas diffusion through the electrode. Each anode also has a tab 730 in this embodiment, allowing for a series electrical connection of the two fuel cells when the fuel cell stack is conformed to a desired shape, such as a cylinder.

Figure 8:
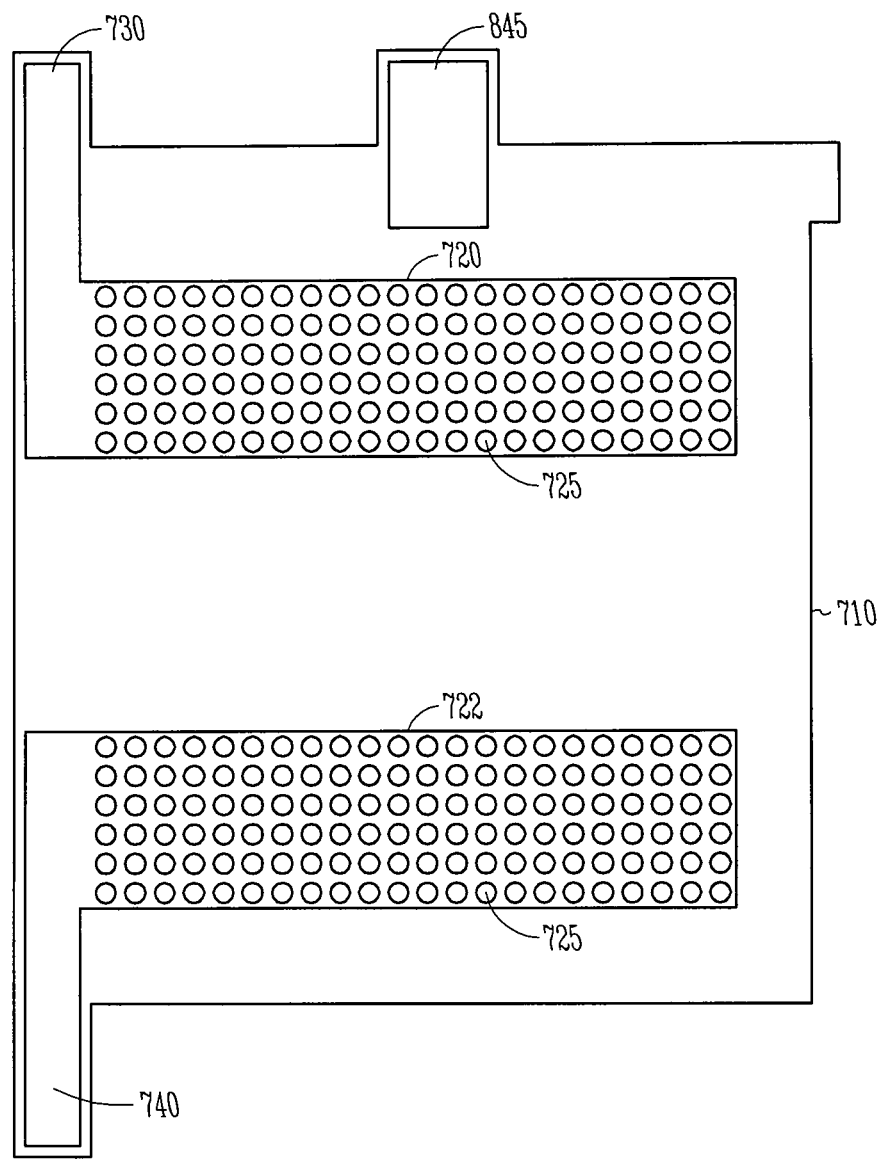
FIG. 8 is a blown up view of a pattern of FIG. 7 according to an example embodiment.

FIG. 8 is a blown up view of pattern 710, illustrating electrodes 720 and 722 in larger form. In one embodiment, one side of the pattern 710 may have an adhesive thereon for adhering to an anode support. In one embodiment, the pattern is 2 mil thick PET with 1 mil adhesive, 200A Ti, and 1 um Au. An extended contact 845 may be provided to make contact with ring 240 when the layers are assembled.

Figure 9:
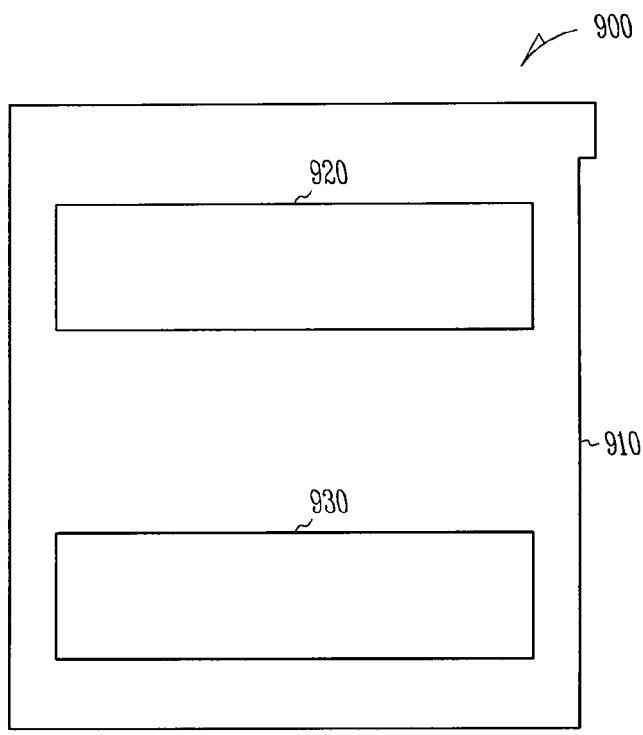
FIG. 9 illustrates an adhesive layer with an anode gas diffusion layer according to an example embodiment.

FIG. 9 illustrates an adhesive layer 900 with an anode gas diffusion layer. An alignment tab 910 is provided in a desired location to facilitate alignment with other layers. Adhesive layer 900 has openings 920 and 930 corresponding to the anodes 720 and 722. In one embodiment, the adhesive layer may be 2 mil thick Kapton with 1 mil adhesive on each side, with total thickness of 4 mils. The thickness may vary considerably if desired and is approximately 0.1 mm thick in a further embodiment. Openings 920 and 930 further comprise gas diffusion layers, such as 4 to 6 mil thick carbon paper in one embodiment.

Figure 10:
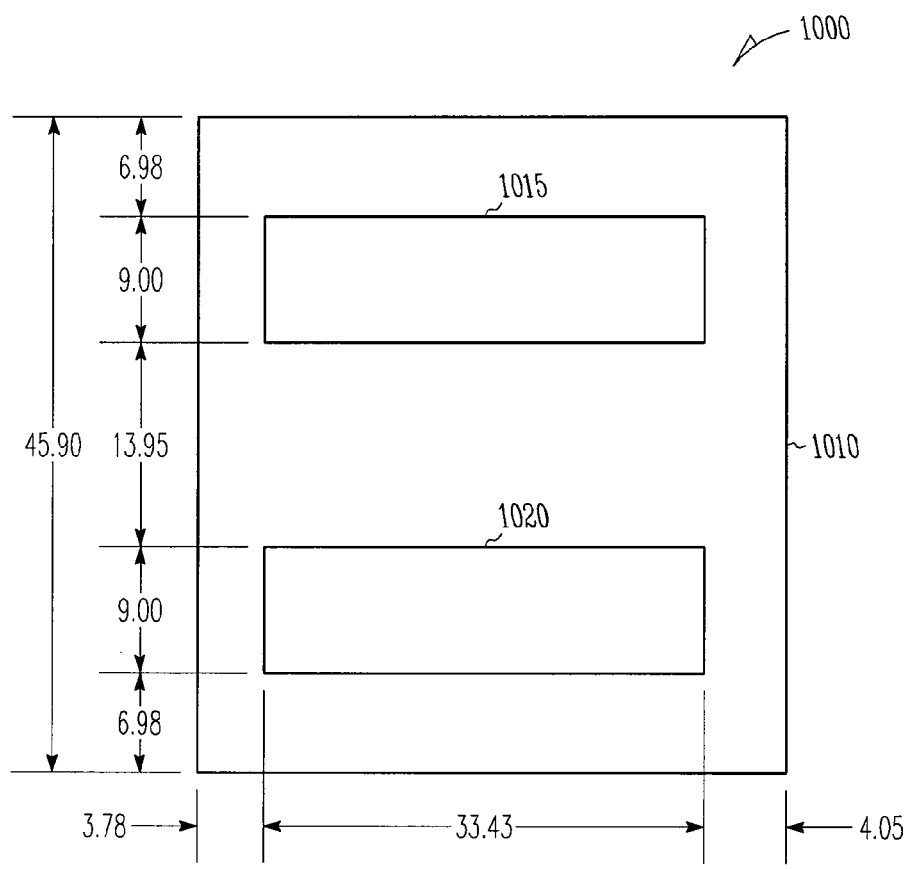
FIG. 10 represents an ion exchange membrane layer according to an example embodiment.

An ion exchange membrane layer is illustrated in FIG. 10 at 1000. In one embodiment, a frame 1010 of Kapton is used to support Nafion membranes 1015 and 1-20. Membranes 1015 and 1020 are positioned to align with 920, 930 and anodes 720 and 722 when assembled. The membranes 1120 and 1115 may be 1 mil thick Nafion NRE211 with 0.5 mg/cm$^2$ of carbon supported platinum electrodes. Different thicknesses of membranes and other layers may be used in further embodiments consistent with retaining a desired flexibility for the fuel cell stack. In one embodiment, two cells are being formed with the multiple layers that will be coupled in series when assembled.

Figure 11:
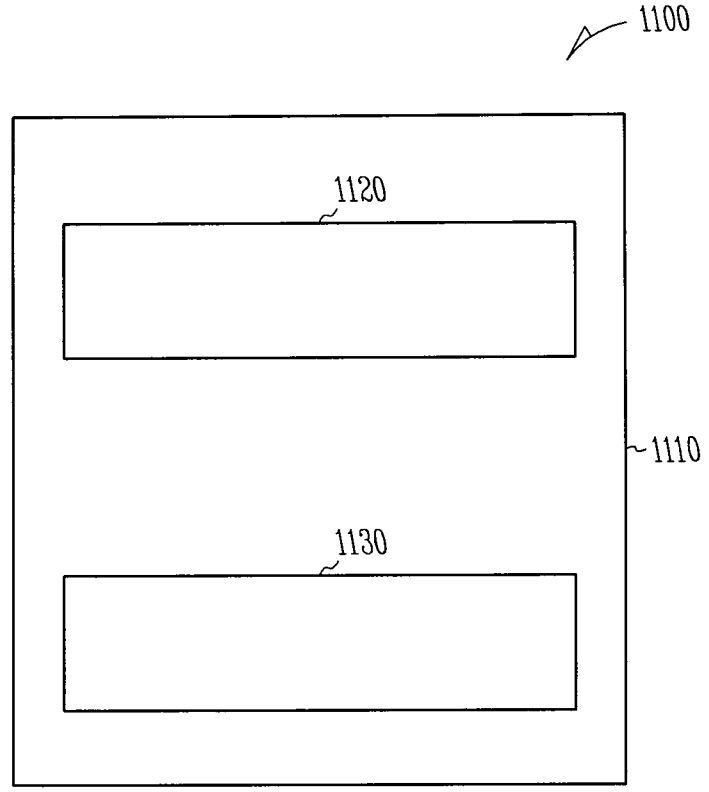
FIG. 11 represents a double sided adhesive layer including a gas diffusion layer for a cathode layer according to an example embodiment.

FIG. 11 at 1100 represents a double sided adhesive layer including a gas diffusion layer for the cathode layer. It may be similar to that shown at 900 in FIG. 9, including two openings 1120 and 1130 for alignment with the cathodes in the next layer. In one embodiment, the adhesive layer may be 2 mil thick Kapton with 1 mil adhesive on each side, with total thickness of 4 mils. The thickness may very considerably if desired and is approximately 0.1 mm thick in a further embodiment. Openings 1120 and 1130 further comprise gas diffusion layers, such as 4 to 6 mil thick carbon paper in one embodiment.

Figure 12:
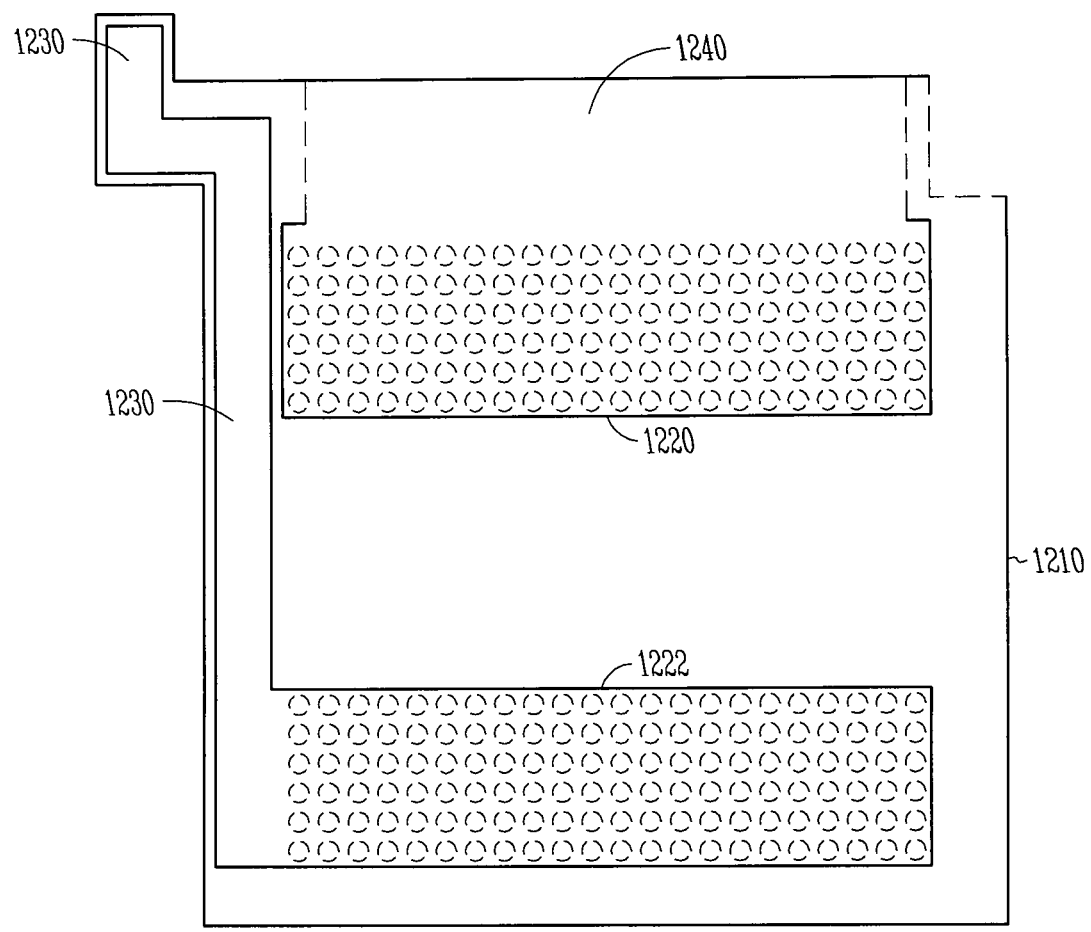
FIG. 12 illustrates a cathode pattern having electrodes with holes according to an example embodiment.
Figure 13:
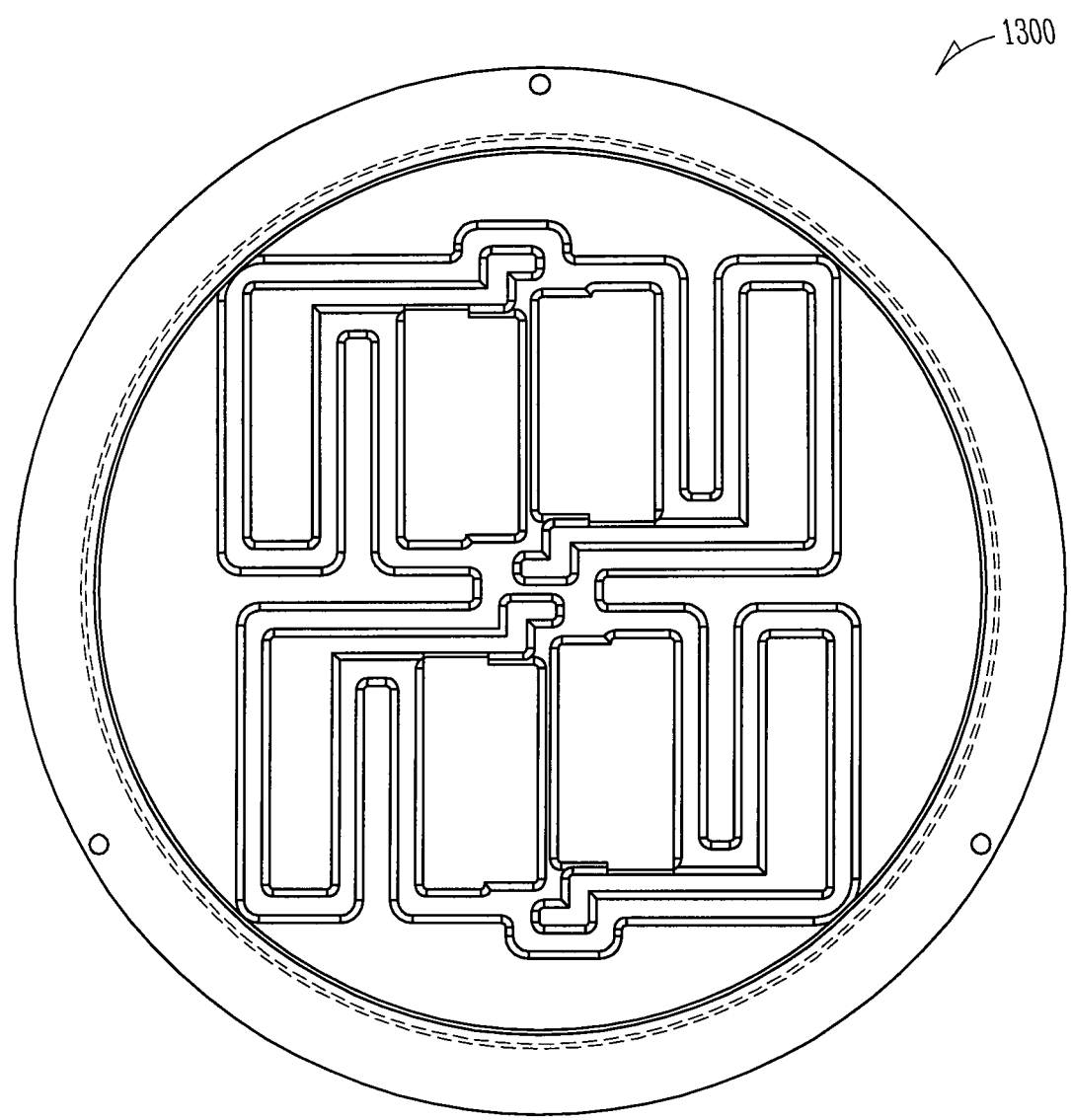
FIG. 13 illustrates an anode mask according to an example embodiment.
Figure 14:
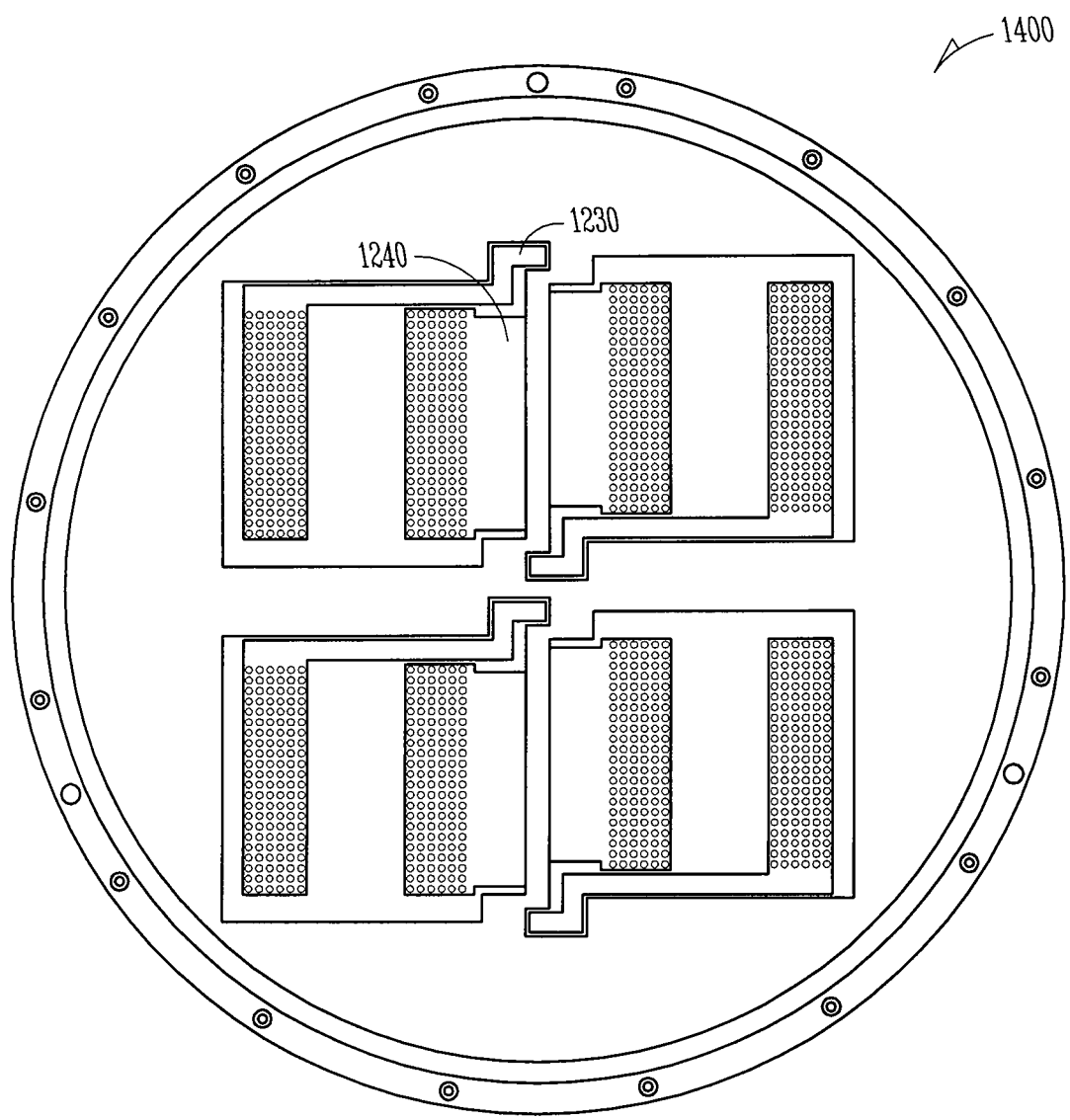
FIG. 14 illustrates multiple anode patterns using the mask of FIG. 13 according to an example embodiment.

FIG. 12 illustrates a cathode pattern 1210 having electrodes 1220 and 1222 shown with holes similar to those in the anodes described earlier. In one embodiment, the pattern is 2 mil thick PET with 1 mil adhesive, 200 A Ti, and 1 um Au. A connector 1230 is shown facilitating coupling of the resulting fuel cells in series. Pattern 1210 may be formed in the same manner as the anode pattern using mask shown at 1300 in FIG. 13, resulting in multiple patterns which are laser cut with holes and cut into separate patters in FIG. 14 at 1400.

Figure 15:
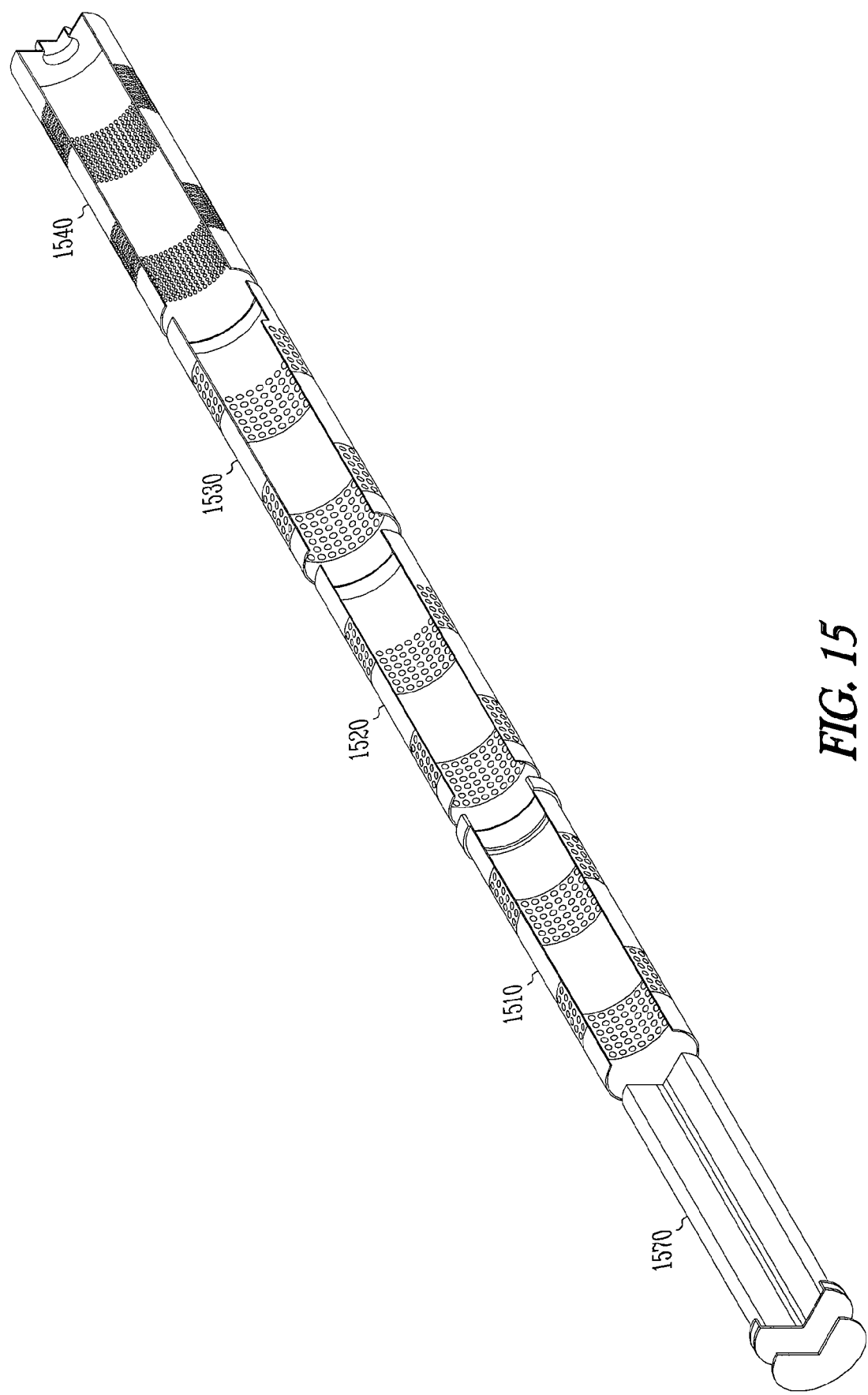
FIG. 15 is an exploded perspective view of a fuel cell stack according to an example embodiment.

The layers of the fuel cell stack described above may be assembled in many different ways. In one embodiment, individual layers may be rolled one by one onto an anode support using a dual roller fixture. In a further embodiment, the layers may be stacked on a planar surface, and then rolled as a stack onto an anode support 1510 as illustrated in FIG. 15, which is an exploded perspective view of a fuel cell stack and power generator according to an example embodiment.

In one embodiment, the order of the fuel cell stack layers is as described above, starting with the anode electrode layer 1520, the adhesive and anode gas diffusion layer, the membrane, the adhesive and cathode gas diffusion layer, followed by the cathode electrode 1530. The anode support 1510 is a rigid cylinder on which the anode electrode is adhered, and supports the stack and compresses it to a specified degree against the inside of container 220.

The resulting two cells are electrically coupled in series in one embodiment by virtue of the electrode designs. Tab 730 on anode 720 and tab 1230 on cathode 1222 are electrically connected. A tab 1240 electrically connects cathode 1220 to anode support 1510. Tab 1240 also connects to the ring 240 and via the ring to contact 945. The ring provides compression to ensure the electrical contact is good. Container 220 is electrically connected to compression ring 240 and functions as the cathode terminal of the power generator. Tab 740 is connected electrically to anode plate 230 which functions as the anode terminal of the power generator. The anode support 1510, with the fuel cell stack layers adhered to it is inserted over the fuel and membrane 1570. FIG. 15 illustrates an efficient and convenient method by which a power generator may be assembled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of forming a power generator, the method comprising:
    forming a multiply perforated container having a desired shape;
    wrapping a fuel cell stack around a multiply perforated anode support within the container, the fuel cell stack having a multiply perforated cathode electrode for exposure to oxygen and a multiply perforated anode electrode for exposure to hydrogen; and
    placing a metal hydride hydrogen producing fuel within the anode support, wherein the fuel cell stack is in close thermal contact with the metal hydride fuel through the anode support wherein the fuel cell stack is formed by the method comprising:
    forming a multiply perforated anode electrode layer comprising an anode electrode portion and a non-electrode portion;
    forming an anode double sided adhesive having a non-adhesive anode gas diffusion layer in an opening therein, said double sided adhesive adhered on one side to the anode electrode layer such that a portion of the anode electrode is in contact with the anode gas diffusion layer;
    forming an ion exchange membrane adhered on a first side to the side of the anode double sided adhesive opposite the anode electrode layer;
    forming a cathode double sided adhesive having a non-adhesive cathode gas diffusion layer in an opening therein, said double sided adhesive adhered on one side to a second side of the ion exchange membrane; and
    forming a multiperforated cathode electrode layer comprising a cathode electrode portion and a non-electrode portion adhered to the cathode double sided adhesive having a non-adhesive cathode gas diffusion layer in an opening therein, on the side opposite the ion exchange membrane, such that a portion of the cathode electrode is in contact with the cathode gas diffusion layer;
    pressing the formed layers together to form a flexible fuel cell stack.

2. The method of claim 1 wherein each of the layers are adhered together forming a gas tight stack.

3. The method of claim 1 wherein the anode layer is formed with fuel cell anodes, each with a tab for facilitating an electrical series connection between two fuel cells in the fuel cell stack.

4. The method of claim 3 and further comprising including a conductive ring at one end of the fuel cell stack to facilitate the series electrical connection between the fuel cells.

5. The method of claim 1 wherein the thickness of the stack is approximately 1mm or less and wherein the container is cylindrical and the stack is conformed to a cylindrical shape.

6. The method of claim 1 wherein the stack is comprised of two series connected fuel cells.

7. A method of making a power generator, the method comprising:
    forming a multiply perforated anode electrode layer; comprising an anode electrode portion and a non-electrode portion forming an anode double sided adhesive having a non-adhesive gas diffusion layer therein, said double sided adhesive adhered on one side to the multiply perforated anode electrode layer such that a portion of the anode electrode is in contact with the anode gas diffusion layer;

forming an ion exchange membrane adhered on a first side to the side of the the anode double sided adhesive opposite the anode electrode layer;

forming cathode double sided adhesive having a non-adhesive cathode gas diffusion layer in an opening therein, said double sided adhesive adhered on one side to a second side of the ion exchange membrane;

forming a multiply perforated cathode electrode layer comprising a cathode electrode portion and a non-electrode portion adhered to the cathode double sided adhesive and having a non-adhesive cathode gas diffusion layer in an opening therein, on the side opposite the ion exchange membrane such that a portion of the cathode electrode is in contact with the cathode gas diffusion layer;

pressing the formed layers together to form a flexible fuel cell stack; and wrapping the flexible fuel cell stack around a metal hydride hydrogen fuel in close thermal contact with the fuel.

8. The method of claim 7 wherein the thickness of the stack is approximately 1 mm or less.

9. The method of claim 7 and further comprising conforming the fuel cell stack to a cylindrical shape.

10. The method of claim 7 wherein the layers are formed such that the fuel cell stack is comprised of two series connected fuel cells.

11. The method of claim 7 wherein each of the layers are adhered together, forming a gas tight stack.

12. The method of claim 7 wherein the anode layer and the cathode layer are formed by depositing a titanium or aluminum layer and depositing gold on such layer.

13. The method of claim 12 wherein the anode layer has two fuel cell anodes, each with a tab and a ring for facilitating an electrical series connection between two fuel cells in the fuel cell stack.

14. The method of claim 7 wherein the gas diffusion layers are formed with carbon paper.

15. The method of claim 7 wherein the ion exchange membrane is formed with Nafion.

16. The method of claim 1, wherein the power generator is self regulating.

* * * * *